United States Patent [19]

White

[11] Patent Number: 4,928,309

[45] Date of Patent: May 22, 1990

[54] METHOD AND APPARATUS FOR DESCRAMBLING A TELEVISION SIGNAL

[75] Inventor: Charles M. White, Perkasie, Pa.

[73] Assignee: General Instrument Corporation, New York, N.Y.

[21] Appl. No.: 332,555

[22] Filed: Mar. 31, 1989

[51] Int. Cl.$^5$ .......................................... H04N 7/167
[52] U.S. Cl. ......................................... 380/15; 380/17
[58] Field of Search .................................... 380/15, 17

[56] References Cited

U.S. PATENT DOCUMENTS

| 3,813,482 | 5/1974 | Blonder . | |
|---|---|---|---|
| 4,095,258 | 6/1978 | Sperber . | |
| 4,163,252 | 7/1979 | Mistry et al. . | |
| 4,542,407 | 9/1985 | Cooper et al. . | |
| 4,571,615 | 2/1986 | Robbins et al. . | |
| 4,688,097 | 8/1987 | Lin | 380/15 |
| 4,712,237 | 12/1987 | Walker | 380/15 |
| 4,771,457 | 9/1988 | Tobita | 380/15 |
| 4,790,011 | 12/1988 | Bellavia | 380/15 |
| 4,815,129 | 3/1989 | Griffin et al. | 380/15 |

OTHER PUBLICATIONS

"Standard Baseband (Audio/Video) Interface between NTSC Television Receiving Devices and Peripheral Devices", originally published as EIA Interim Standard IS-15, Jan. 4, 1989, Consumer Electronics Group, Electronic Industries Association, Washington, D.C.

Primary Examiner—Stephen C. Buczinski
Attorney, Agent, or Firm—Barry R. Lipsitz

[57] ABSTRACT

A baseband television signal having a video portion with a suppressed horizontal sync pulse is descrambled by using a variable attenuator. The attenuator shifts the level of predetermined portions of the signal to restore the suppressed horizontal sync pulse to a normal unsuppressed level with respect to the rest of the signal. A reference voltage is derived from a blanking level potential and sync level potential of the signal, and is equal to the zero carrier level of the video portion of the signal. The reference voltage is utilized to maintain the level of the restored sync pulse at a proper value.

20 Claims, 4 Drawing Sheets

METHOD AND APPARATUS FOR DESCRAMBLING A TELEVISION SIGNAL

BACKGROUND OF THE INVENTION

This invention relates to a converter for a cable television system or the like, and more particularly to a baseband converter for descrambling sync suppressed video television signals.

Cable systems typically provide basic services for a fixed monthly fee, and one or more premium channels at an additional cost. In order to prevent subscribers who have not paid for a premium channel from viewing the premium channel, such channels are usually scrambled or encrypted. Those subscribers who are authorized to receive the premium channel are provided with a descrambler to enable the channels to be viewed. In response to the various services provided by cable television operators, television manufacturers are offering models which tune both broadcast and cable only channels. Televisions, video recorders, and other video appliances adapted to receive cable channels are often referred to as "cable ready" or "cable compatible".

In present day systems, the term "cable ready" is somewhat of a misnomer. Even though the cable ready video appliance can receive cable channels without a separate tuner, the video appliance is not able to descramble premium channels. A separate descrambler box is still required to descramble the channel signals before they are input to the user's video appliance. The separate descrambler box, also referred to as a "converter/decoder" or simply "converter", tunes the full range of cable channels and decodes or unscrambles premium channels as necessary, providing an output to the subscriber's television receiver on a single broadcast channel, typically channel 3 or channel 4. A subscriber is thus unable to make full use of remote tuning and other features of his cable ready appliance. Where the converter from the cable company and the user's own video appliance both employ remote control units, confusion often arises as to which remote control is needed to obtain a desired operation. Further, unnecessary expense results from the duplication of tuning, intermediate frequency ("IF") and remote control systems in both the converter and the subscriber's video appliance.

Television signals broadcast through the air or over a cable are transmitted at radio frequencies ("RF"). In a conventional converter, television set, or other video appliance, a tuner is provided to tune to a single channel out of a plurality of channels traveling down a cable system or through the airwaves. Then, the tuned channel is mixed with a sinewave and changed to a different, intermediate frequency. This intermediate frequency signal is demodulated to provide a "baseband" television signal at a frequency well below the RF band.

One solution to the problems noted above with respect to cable ready video appliances is to provide a baseband interface on the video appliance (e.g., a cable subscriber's television receiver) to accommodate a converter designed to be compatible with the interface. Such an interface enables a channel to be selected via the tuner in the subscriber's video appliance, instead of by a separate tuner in the converter. The baseband signal produced by the subscriber's video appliance is then accessed and used as the input to the converter. The converter descrambles the baseband signal, and returns it to the display and audio section of the subscriber's video appliance. This scheme permits the cable operator to reduce the cost of equipment which is normally provided to the subscriber. At the same time, since the subscriber is using the tuner and other controls on his own television set or other video appliance, he can make full use of the features provided in his video appliance, and contend only with the remote control provided with his appliance.

A standard for such an interface has been published by the Consumer Electronics Group, Electronic Industries Association of Washington, D.C., U.S.A., as EIA Interim Standard IS-15, entitled, *Standard Baseband (Audio/Video) Interface Between NTSC Television Receiving Devices and Peripheral Devices.* This standard is incorporated herein by reference.

A common technique for scrambling premium channels provided over a cable television system is known as sync suppression. In this scheme, the horizontal and/or vertical synchronization pulses normally found in the video portion of the television signal are attenuated so that a television receiver cannot lock onto them, preventing the proper display of the video signal. In order to render the signal useable, it must be "descrambled" by restoring the synchronization pulses to a normal, unsuppressed level.

It would be advantageous to provide a converter for use with a television or other video appliance using the IS-15 standard. Such a converter would have to descramble a baseband video signal. It would be further advantageous to provide such a converter that descrambles sync suppressed video television signals at baseband frequencies. The present invention relates to such a converter.

SUMMARY OF THE INVENTION

In accordance with the present invention, a baseband converter is provided for descrambling sync suppressed video television signals. The converter includes a signal level processor having an input and an output. Means are provided for coupling the input of the signal level processor to receive a baseband television signal having a video portion with suppressed sync pulses. Control means, coupled to the signal level processor, are provided for causing the processor to shift the level and amplitude of predetermined portions of the signal to restore the sync pulse to a normal, unsuppressed level with respect to the rest of the baseband television signal. Means are provided for coupling the level shifted signal from the output of the processor to a video appliance. In a preferred embodiment, the signal level processor comprises a varilosser for variably attenuating predetermined portions of the signal in response to the control means. A reference voltage is derived, which is equal to the zero carrier level of the video portion of the baseband television signal. This reference voltage is applied to the varilosser, and used by the varilosser to maintain the level of the restored sync pulse at a proper value. The deriving means may comprise means for sampling a blanking level potential of the video portion of the baseband television signal and means for sampling a sync level potential of the video portion of the baseband television signal. Means, coupled to receive the sampled blanking level and sync level potentials, combine the potentials according to a predetermined formula to produce the reference voltage. In an NTSC television system, the formula used is four times the blanking level potential minus three times the sync level potential.

A video appliance used in conjunction with the converter of the present invention can include a tuner for selecting a scrambled television channel signal from a cable television drop or the like, and a demodulator coupled to the tuner for demodulating the television channel signal to produce the baseband television signal. The baseband television signal is input from the video appliance to the converter. The converter also includes means for tapping into the cable television drop to receive control data carried thereon, and means for processing the control data to provide timing information to the control means for use in restoring the sync pulse.

The varilosser of the present invention can comprise first switch means for passing the baseband television signal to the signal level processor output with zero attenuation during a sync interval portion of the baseband television signal, and second switch means for passing the baseband television signal to the signal level processor output with a predetermined non-zero attenuation during a video information portion of the baseband television signal.

Means can further be provided for limiting the value of the reference voltage used by the varilosser to remain within a predefined range.

A method for descrambling a baseband television signal having a video portion with a suppressed horizontal sync pulse is also provided.

DETAILED DESCRIPTION OF THE INVENTION

A common way of scrambling video signals for cable television systems is by suppressing the horizontal sync pulse in the video signal. This typically requires an active RF attenuator on the scrambler which switches in a determined amount of attenuation, typically six or ten dB, during the sync and blanking interval of the video signal. Additional pulses or signals are also added to aid in the descrambling process at the subscriber end of the process. At the subscriber end, where descrambling takes place, a complementary active RF attenuator was typically used to switch in a predetermined amount of attenuation at a time opposite the suppression time at the scrambler. Thus, with the system operating properly and in synchronization, the net attenuation of the video signal was constant and the sync pulses were recovered. In such prior art systems, the attenuators were all at modulated RF (or IF) prior to detection. Thus, the attenuator action was relative to the zero carrier level of the video signal.

The present invention provides for scrambling and descrambling at baseband video instead of modulated RF or IF video. Such scrambling and descrambling is more difficult at baseband because the zero carrier level is lost. Thus, the present invention provides baseband video sync suppression/recovery by using a self-derived reference potential equal to the zero carrier level of the original video signal.

Figure 1:
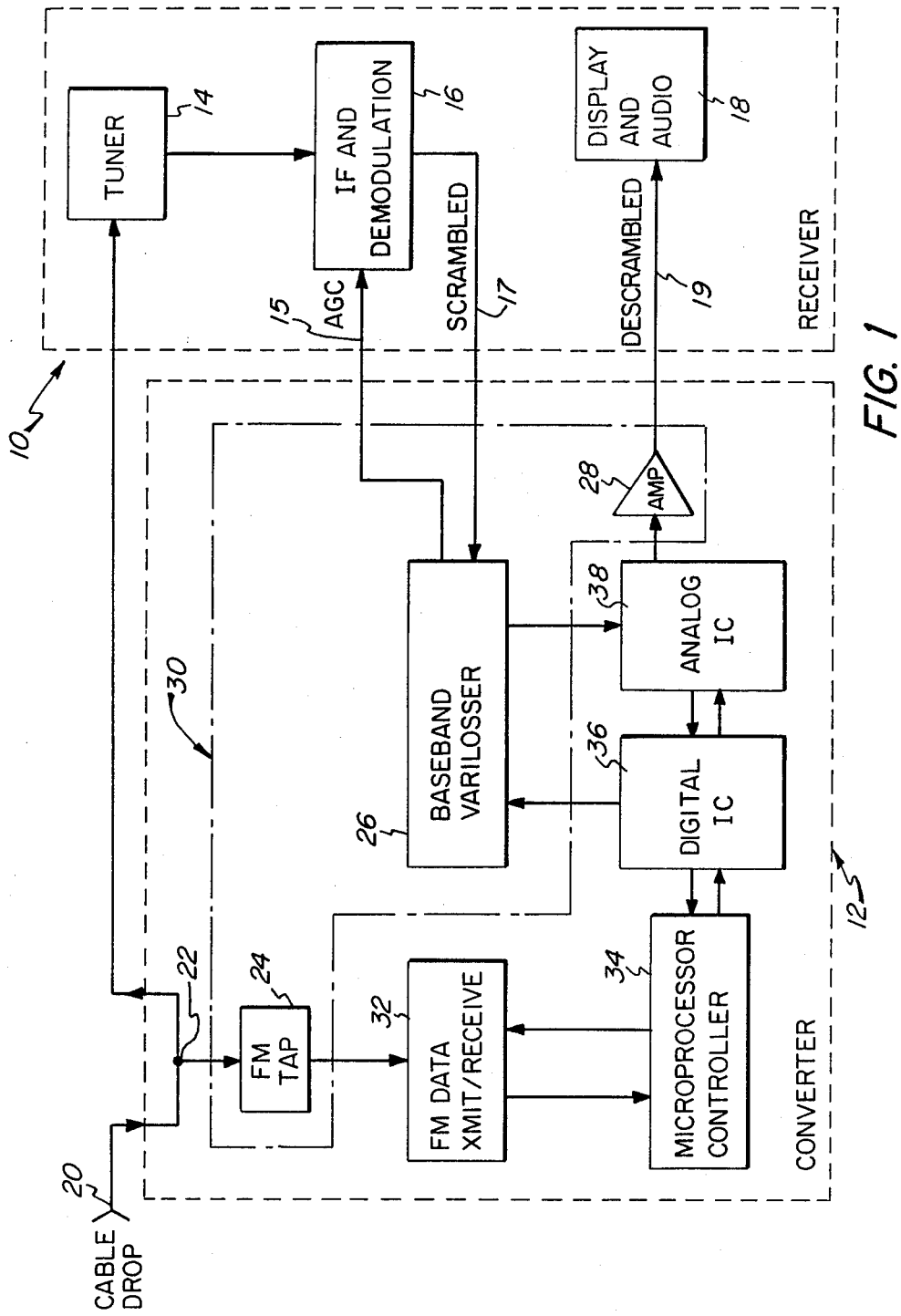
FIG. 1 is a block diagram of a converter and television receiver illustrating the present invention.

FIG. 1 is a block diagram illustrating the overall configuration of a converter 12 and receiver 10 in accordance with the present invention. Receiver 10 includes a tuner 14 that is fed directly from a cable television cable drop 20 and tuned to a cable television channel to be received. Those skilled in the art will appreciate that a cable television signal can alternately be received from means other than a cable television network, for example, from a satellite feed or by direct broadcast.

Receiver 10 detects the video and audio output from tuner 14 using IF and demodulation circuitry 16, and feeds the detected video and audio to converter 12 via line 17. Converter 12 is used to descramble a scrambled channel selected by tuner 14. In the event tuner 14 is tuned to an unscrambled channel, a gate (not shown) connects the unscrambled signal from IF and demodulation circuitry 16 directly to the television display and audio circuitry 18, without passing the signal through converter 12.

When a scrambled signal is passed on line 17 to converter 12, the converter descrambles the baseband video and audio inputs and supplies descrambled video and audio to receiver 10 via line 19, together with DC accurate sync restored video for the receiver's AGC circuits via line 15. Additionally, converter 12 supplies control signals to the receiver 10 which cause the receiver to select the descrambled video when a scrambled channel is selected by the user, and the descrambled audio when the audio is in audio privacy mode. Additional control signals (not shown in FIG. 1) are used so that the converter can cause the receiver to select either the descrambled video and audio signals from the converter or the receiver's own video and audio signals in the event that these are not scrambled.

Receiver 10 also supplies a "channel change" signal on line 17 which goes low when the receiver is off or being tuned to a new channel. This signal is used to cause the converter to blank the video during channel change until the converter has read new data "tags" which are required by the converter to descramble a scrambled signal.

In order to receive converter control signals which are transmitted via an FM control data path together with the cable television signals from the cable system operator ("CATV headend"), the cable signal is looped through converter 12 on its way to receiver 10. In converter 12, the FM signal is tapped off the cable at node 22 by FM tap 24, which comprises a filter tuned to the FM band. The data recovered by FM tap 24 is passed to conventional FM data transmit/receive circuitry 32 for use by microprocessor controller 34. A digital integrated circuit chip 36 is used to recover timing information and tags from the video signal. This timing information is used to accomplish recovery of the suppressed synchronization pulses in the scrambled baseband signal input to converter 12 via line 17 from receiver 10. Analog integrated circuit chip 38 can be similarly used to descramble video signals scrambled using standard video inversion techniques. The scrambling of video signals by video inversion is described in U.S. Pat. No. RE. 31,735, dated Nov. 13, 1984 and entitled, *Subscriber-Limited Reception Television Broadcast Security Encoder-Decoder System*. Components 32, 34, 36 and 38 of converter 12 are all conventional and are used, for example, in the model DPBB7 converter manufactured and sold by the Jerrold Division of General Instrument Corporation, Hatboro, Pennsylvania.

In accordance with the present invention, additional circuitry 30 is provided in converter 12 to descramble a baseband television signal. Component 26 is a baseband varilosser that is used to recover the suppressed sync pulses using a self-derived reference potential. Amplifier 28 is used to restore the descrambled signal to a normal signal level for input to receiver 10.

Figure 2:
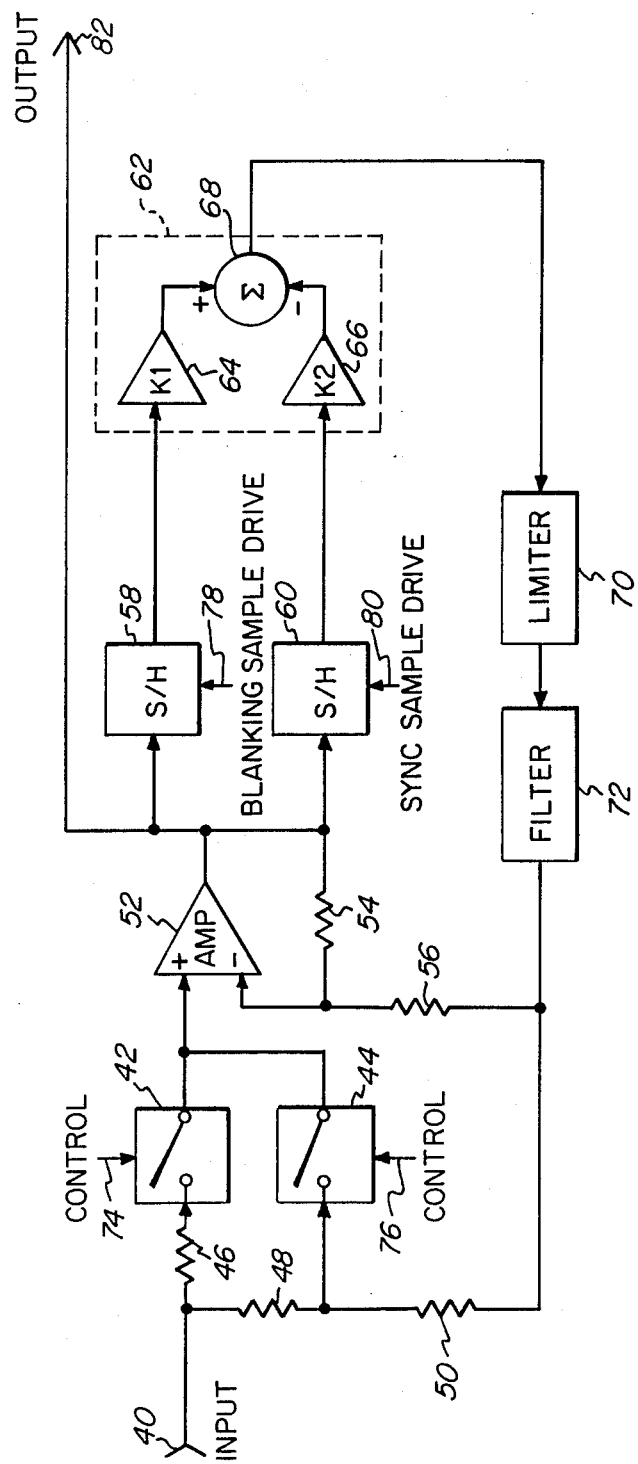
FIG. 2 is a schematic diagram showing one embodiment of a baseband varilosser and associated descrambling circuitry in accordance with the present invention.

Turning now to FIG. 2, a schematic diagram of one embodiment of varilosser 26 is shown. Video which has been scrambled by attenuating the signal during the sync and blanking interval relative to the zero carrier level is applied at input terminal 40. An example of such a video signal is depicted by waveform 170 shown in FIG. 4. Comparing waveform 170 to waveform 150, which represents a conventional non-scrambled video signal, it is seen that the sync and blanking interval 181 of scrambled signal 170 is attenuated as compared to the unscrambled signal 150. The zero carrier level 152 for both waveforms remains the same. In waveform 150, the spread between the blanking level 154 and sync level 156 is greater than the corresponding spread between levels 174 and 176 in waveform 170. Thus, sync pulse 178 in waveform 170 is attenuated with respect to normal sync pulse 158 in waveform 150. The waveform of 170 includes an additional modification, namely, a video inversion reference pulse 180 has been added to be used in recovering inverted video which may optionally be used to scramble portions of video signal 184. The amplitude of pulse 180 corresponds to inversion reference level 172.

Conventional color burst signal 160 and video information signal 162 are shown in waveform 150. The corresponding color burst 182 in waveform 170 is attenuated. The video information signal 184 of waveform 170 is not attenuated, and is the same as that in waveform 150, absent the optional use of video inversion scrambling.

Upon the application of waveform 170 to input 40 of the circuit shown in FIG. 2, the signal is applied to a varilosser that includes switches 42 and 44. A control signal from digital IC 36 (FIG. 1) is input to switch 42 on line 74, and closes switch 42 during the sync and blanking interval ("scrambling interval") 181 of waveform 170. At the end of the sync and blanking interval 181, switch 42 is opened and switch 44 is closed by a control signal from digital IC 36 on line 76.

Figure 4:
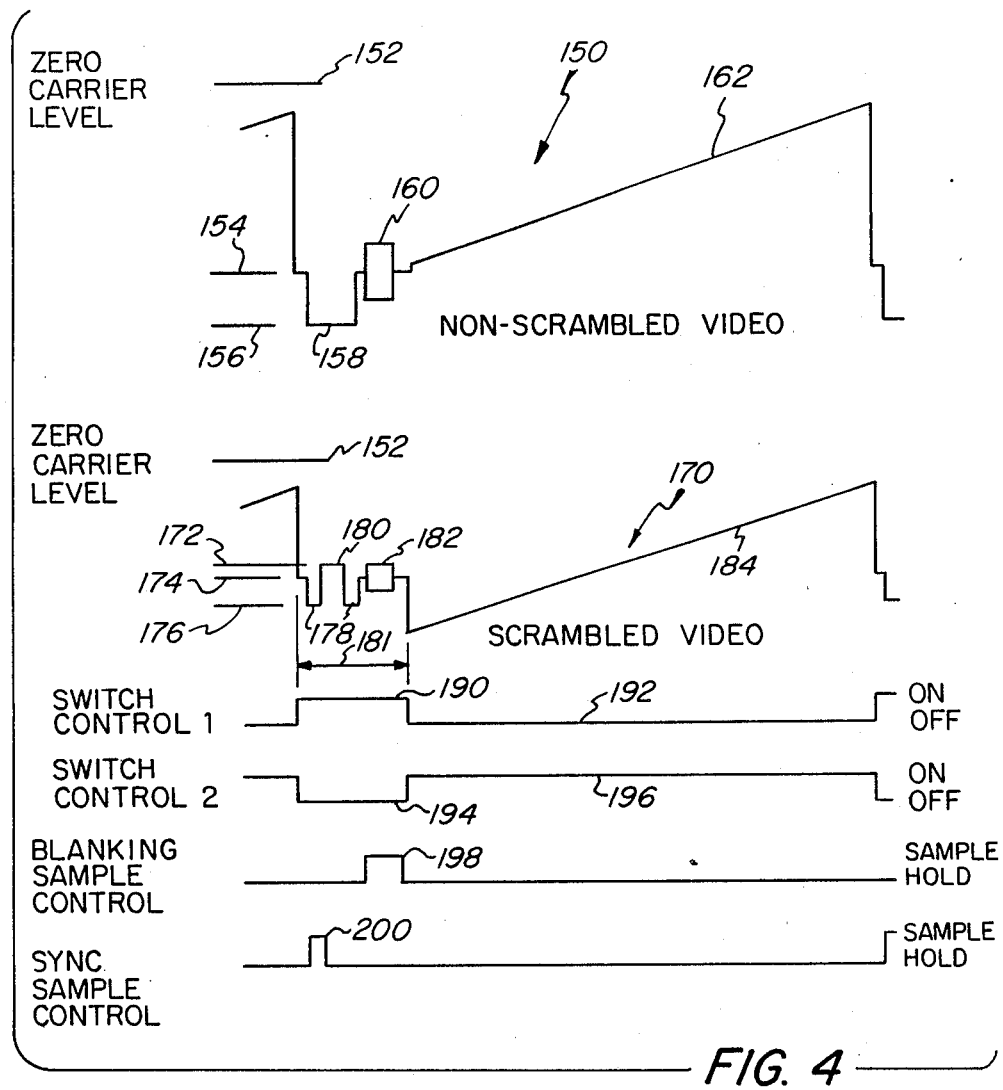
FIG. 4 is a plurality of waveforms illustrating the video and control signals which are present or used at various points of the circuitry shown in FIGS. 2 and 3.

Waveforms for controlling switches 42 and 44 are shown in FIG. 4. Switch 42 is turned on by pulse 190 during the scrambling interval 181 of the video signal. Switch 42 is maintained in an off position as indicated at 192 during the video information portion 184 of the video signal. Switch 44 is turned off as indicated at 194 during the scrambling interval 181, and turned on to attenuate the video information portion 184 of the video signal as indicated at 196.

Resistors 48, 50 provide an attenuation of the video signal equivalent to the attenuation used in the scrambling interval 181. This attenuation, which is typically on the order of 6 or 10 dB, is relative to the zero carrier reference voltage of the input television signal. Resistor 46 provides no attenuation, and is used to match the impedance of the network provided by resistors 48, 50 so that the video signal has matching phase/delay characteristics through both switches 42 and 44.

An amplifier 52 is provided at the output of switches 42, 44 together with feedback resistors 54, 56 to provide gain, relative to the zero carrier level. This gain is normally set to provide a unity gain for the system by having the ratio (resistor 54÷resistor 56) equal to (resistor 48÷resistor 50). Those skilled in the art will recognize that amplifier 52 can be designed to provide virtually any other value of gain. In fact, amplifier 52 may be eliminated entirely, or may be configured as a voltage follower.

The output of amplifier 52 is the descrambled video signal, output from the converter at terminal 82. The same signal is input to sample and-hold circuits 58 and 60. Sample and hold circuit 58 samples the blanking level potential during the blanking level interval portion of scrambling interval 181. Sampling by sample and hold circuit 58 is controlled by digital IC 36, which sends a blanking sample drive signal via line 78.

Sample and hold circuit 60 samples the sync level potential of the television signal during the sync interval portion of scrambling interval 181. Sampling is initiated by a sync sample drive signal output from digital IC 36 on line 80.

Waveforms for controlling sample and hold circuits 58, 60 are shown in FIG. 4. Sample and hold circuit 58 is actuated to sample the blanking level potential of the video signal by pulse 198. Sample and hold circuit 60 is actuated to sample the sync level potential by pulse 200.

The sampled blanking level and sync level potentials are used in order to determine the zero carrier level of the television signal according to a known relationship. When the television signal is transmitted using the NTSC standard (used in North America), the formula used to determine the zero carrier level is four times the blanking level potential minus three times the sync level potential. Circuitry 62 is used to derive the zero carrier level.

Circuitry 62 includes an amplifier 64 with a scaling factor K1, and an amplifier 66 with a scaling factor K2. The outputs of amplifiers 64 and 66 are summed in summing circuit 68 to provide the zero carrier level. Where the NTSC standard is used, the scaling factor K1 will be 4 and the scaling factor K2 will be 3.

The zero carrier level signal output from summing circuit 68 is input to a limiter 70 that serves to limit the maximum swing of the zero carrier reference voltage. Limiter 70 constrains the zero carrier reference voltage to near its nominal level during times when the synchronization timing circuitry (microprocessor controller 34 and digital IC 36) that controls switches 42, 44 and sample and hold circuits 58, 60 is out of lock with the input video. This situation typically occurs when a user first turns his television on or changes a channel. Thus, limiter 70 serves to minimize the lock-in time for the system.

Figure 3:
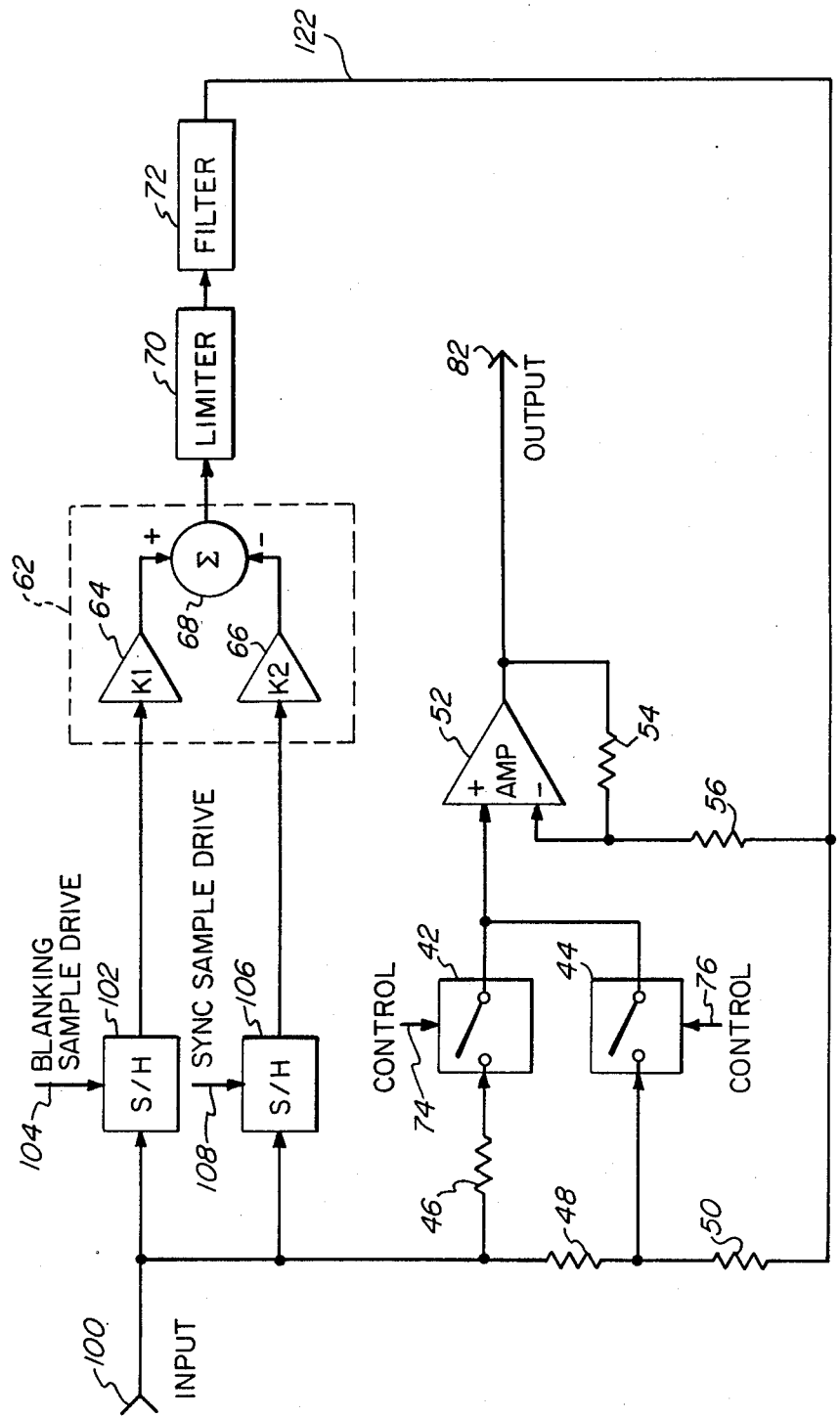
FIG. 3 is a schematic diagram of another embodiment of a varilosser and associated descrambling circuitry in accordance with the present invention.

The output of limiter 70 is a DC potential equal to the zero carrier voltage. Since the zero carrier voltage is the same before and after descrambling, the source for the sample and holds 58, 60 can either be the scrambled or descrambled video, as long as the process is DC accurate with no offsets. An implementation where the sample and hold circuits work off of the scrambled video is shown in FIG. 3.

Filter 72 in FIG. 2 is a low pass filter that reduces the effects of noise, spikes, and glitches (generally, high frequency components) from the outputs of sample and hold circuits 58, 60. Such high frequency components could adversely effect the output video.

From filter 72, the zero carrier level signal is applied to the varilosser formed by switches 42, 44 and resistors 48, 50 as a reference voltage to maintain the level of the sync pulse restored by the operation of the varilosser at a proper value.

In a minimal implementation, amplifier 52 and associated resistors 54, 56 together with limiter 70 and filter 72 can be eliminated from the circuit of FIG. 2. Such a circuit operates essentially the same as that shown in FIG. 2, but has worse noise, accuracy, and lock-in time characteristics.

The circuit of FIG. 3 is a fully feed forward implementation wherein the blanking sample and sync sample are taken from the scrambled video signal input at terminal 100. Sample and hold circuits 102, 106 provide the same function as similar circuits 58, 60 in FIG. 2. Sample and hold 102 is controlled by a blanking sample drive signal on line 104. Sample and hold 106 is controlled by a sync sample drive signal on line 108. The remaining components are the same as those shown in FIG. 2. The zero carrier level is output from filter 72 on line 122, which couples it to the varilosser for output of a descrambled television signal at output terminal 82. As with the circuit of FIG. 2, limiter 70, filter 72, and amplifier 52 with associated resistors 54, 56 can be eliminated from the implementation of FIG. 3. However, the performance of the descrambler is degraded in such a minimal implementation.

Those skilled in the art will appreciate that due to the symmetry of the scrambling/descrambling process with which the present invention is concerned, the circuitry of FIGS. 2 or 3 will perform equally well as a sync suppression mode scrambler, instead of a descrambler, if unscrambled video is applied to the input.

It should now be recognized that the present invention provides an apparatus and method for descrambling (or scrambling) sync suppressed video at baseband by using a switched attenuator referenced to the zero carrier potential of the video signal. The zero carrier potential is derived by sampling sync and blanking level potentials of either the original input television signal or of the signal after descrambling. The invention is broad enough to contemplate substituting amplifier stages having varying gain for the variable attenuators provided by switches 42, 44 and their associated resistors. In this manner, the horizontal sync pulse recovery is accomplished using switchable gain instead of switchable attenuation. It is noted that the use of switchable gain is somewhat more difficult than the switched attenuation shown in the figures, due to phase shifts that result from varying the gain.

Although various embodiments have been illustrated in connection with the present invention, it should be appreciated that numerous modifications and alterations may be made thereto without departing from the spirit and scope of the invention, as set forth in the following claims.

What is claimed is:

1. A baseband converter for descrambling sync suppressed video television signals comprising:
    a signal level processor having an input and an output;
    means for coupling the input of said signal level processor to receive a baseband television signal having a video portion with suppressed sync pulses;
    control means coupled to said signal level processor for causing the processor to shift the level of predetermined portions of said signal to restore said sync pulses to a normal unsuppressed level with respect to the rest of the baseband television signal;
    means for deriving a reference voltage equal to the zero carrier level of the video portion of said baseband television signal;
    means for applying the reference voltage to said signal level processor for use in maintaining the level of the restored sync pulse at a proper value; and
    means for coupling the level shifted signal from the output of said processor to a video appliance.

2. The converter of claim 1 wherein said signal level processor comprises a varilosser for variably attenuating predetermined portions of said signal in response to said control means.

3. The converter of claim 2 wherein said sync pulses are horizontal sync pulses.

4. The converter of claim 2 wherein said deriving means comprises:
    means for sampling a blanking level potential of the video portion of said baseband television signal;
    means for sampling a sync level potential of the video portion of said baseband television signal; and
    means, coupled to receive the sampled blanking level and sync level potentials, for combining said potentials according to a predetermined formula to produce said reference voltage.

5. The converter of claim 4 wherein said formula is four times the blanking level potential minus three times the sync level potential.

6. The converter of claim 1 wherein said baseband television signal is received from said video appliance.

7. The converter of claim 6 wherein said video appliance includes a tuner for selecting a scrambled television channel signal from a cable television drop or the like, and a demodulator coupled to said tuner for demodulating the television channel signal to produce said baseband television signal, said converter further comprising:
    means for tapping into said cable television drop to receive control data carried thereon; and
    means for processing said control data to provide timing information to said control means for use in restoring said sync pulse.

8. The converter of claim 2 wherein said varilosser comprises:
    first switch means for passing said baseband television signal to said signal level processor output with zero attenuation during a sync interval portion of said baseband television signal; and
    second switch means for passing said baseband television signal to said signal level processor output with a predetermined non-zero attenuation during a video information portion of said baseband television signal.

9. The converter of claim 8 further comprising:
    means for sampling a blanking level potential of said baseband television signal;
    means for sampling a sync level potential of said baseband television signal;
    means, coupled to receive the sampled blanking level and sync level potentials, for combining said potentials according to a predetermined formula to produce a reference voltage equal to the zero carrier level of said baseband television signal; and
    means for applying said reference voltage to said varilosser to maintain the level of the restored sync pulse at a proper value.

10. The converter of claim 9 wherein said formula is four times the blanking level potential minus three times the sync level potential.

11. The converter of claim 9 further comprising means, coupled to said combining means, for limiting the value of said reference voltage to remain within a predefined range.

12. A method for descrambling a baseband television signal having a video portion with suppressed sync pulses, comprising the steps of:
   receiving a scrambled demodulated baseband television signal from a video IF output of a video appliance;
   shifting the level of predetermined portions of the received signal to restore a suppressed sync pulse in said signal to a normal unsuppressed level with respect to the rest of the signal;
   deriving a reference voltage from a blanking level potential and a sync level potential of said signal, said reference voltage being equal to the zero carrier level of the video portion of said signal;
   utilizing said reference voltage to maintain the level of the restored sync pulse at a proper value; and
   returning the signal with the restored sync pulse to a video processing stage of said video appliance.

13. The method of claim 12 wherein said shifting step comprises the steps of:
   passing said received signal through a first signal path during a sync interval portion thereof to attenuate the signal at a first level of attenuation; and
   passing the received signal through a second signal path during a video information portion thereof to attenuate the signal at a second level of attenuation.

14. The method of claim 13 wherein said first level of attenuation is zero and the second level of attenuation is greater than zero.

15. The method of claim 12 wherein said deriving step comprises the steps of:
   sampling the blanking level potential;
   sampling the sync level potential; and
   combining the sampled potentials according to a predetermined formula to produce said reference voltage.

16. The method of claim 15 wherein said formula is four times the blanking level potential minus three times the sync level potential.

17. The method of claim 12 wherein said video appliance includes a tuner for selecting a scrambled television channel signal from a cable television drop or the like, and a demodulator coupled to said tuner for demodulating the television channel signal to produce said baseband television signal, and including the further steps of:
   tapping into said cable television drop to receive control data carried thereon; and
   processing said control data to provide timing information for use during said shifting step.

18. Apparatus for scrambling or descrambling a baseband video signal, comprising:
   an input terminal;
   first switchable attenuator means coupled to said input terminal for attenuating a signal input to said input terminal at a first level of attenuation;
   second switchable attenuator means coupled to said input terminal for attenuating said signal at a second level of attenuation;
   control means coupled to said first and second switchable attenuator means for switching said first attenuator on during a first portion of said signal corresponding to a sync interval, and for switching said second attenuator on during a second portion of said signal corresponding to a video information interval;
   means for deriving a reference voltage from said signal corresponding to a zero carrier level of the signal;
   means for coupling said reference voltage to said first and second switchable attenuator means;
   an output terminal; and
   means for coupling the attenuated signal from said first and second switchable attenuator means to said output terminal.

19. The apparatus of claim 18 wherein said first level of attenuation is zero and the second level of attenuation is greater than zero.

20. The apparatus of claim 18 further comprising:
   means for receiving timing information pertaining to video portions of said signal; and
   means for coupling said timing information to said control means;
   wherein said control means uses the timing information to identify the sync and video information intervals for switching said attenuators.

* * * * *